United States Patent [19]

Weyer et al.

[11] Patent Number: 5,659,068

[45] Date of Patent: *Aug. 19, 1997

[54] PREPARATION OF POLYOXYALKYLENE GLYCOL MONOESTERS OF MONOCARBOXYLIC ACIDS

[75] Inventors: Hans-Juergen Weyer, Mannheim; Rolf Fischer, Heidelberg; Gerhard Jeschek, Gruenstadt; Herbert Mueller, Frankenthal, all of Germany

[73] Assignee: BASF Aktiengesellschaft, Ludwigshafen, Germany

[*] Notice: The term of this patent shall not extend beyond the expiration date of Pat. No. 5,416,240.

[21] Appl. No.: 255,549

[22] Filed: May 31, 1994

Related U.S. Application Data

[63] Continuation of Ser. No. 843,809, Feb. 28, 1992, abandoned.

[30] Foreign Application Priority Data

Mar. 13, 1991 [DE] Germany .................... 41 08 046.7

[51] Int. Cl.⁶ .................... C07C 41/01; C07C 41/02
[52] U.S. Cl. .................... 560/103; 560/240; 568/606; 568/607; 568/616; 568/617
[58] Field of Search .................... 560/240, 103; 568/617, 606, 607, 616

[56] References Cited

U.S. PATENT DOCUMENTS

| 4,243,799 | 1/1981 | Mueller | 560/240 |
|---|---|---|---|
| 4,259,531 | 3/1981 | Huchler et al. | 568/617 |
| 4,291,101 | 9/1981 | Tanizaki et al. | |
| 4,482,411 | 11/1984 | Stephens et al. | |
| 5,416,240 | 5/1995 | Weyer et al. | 568/617 |

FOREIGN PATENT DOCUMENTS

| 286454 | 10/1988 | European Pat. Off. |
| 58-028 | 5/1983 | Japan . |
| 79223 | 4/1987 | Japan . |
| 138452 | 6/1987 | Japan . |
| 303190 | 9/1988 | Japan . |

OTHER PUBLICATIONS

Topics in Current Chemistry, 76 (1978).

T. and L. Shedlovsky in A. Weissberger, B.W. Rossiter (Ed.): Techniques of Chemistry, vol. I (1971) pp. 163–204.

Makromol. Chem. 190 (1989) p. 929.

Primary Examiner—Joseph Conrad
Attorney, Agent, or Firm—John H. Shurtleff

[57] ABSTRACT

Polyoxyalkylene glycol monoesters of carboxylic acids are prepared by a process in which tetrahydrofuran or a mixture of tetrahydrofuran with a total of not more than 95 mol %, based on the amount of tetrahydrofuran used, of one or more comonomers from the group consisting of the cyclic ethers and acetals is polymerized in the absence of water and in the presence of a carboxylic acid and of an anhydrous heteropolyacid catalyst.

23 Claims, 1 Drawing Sheet

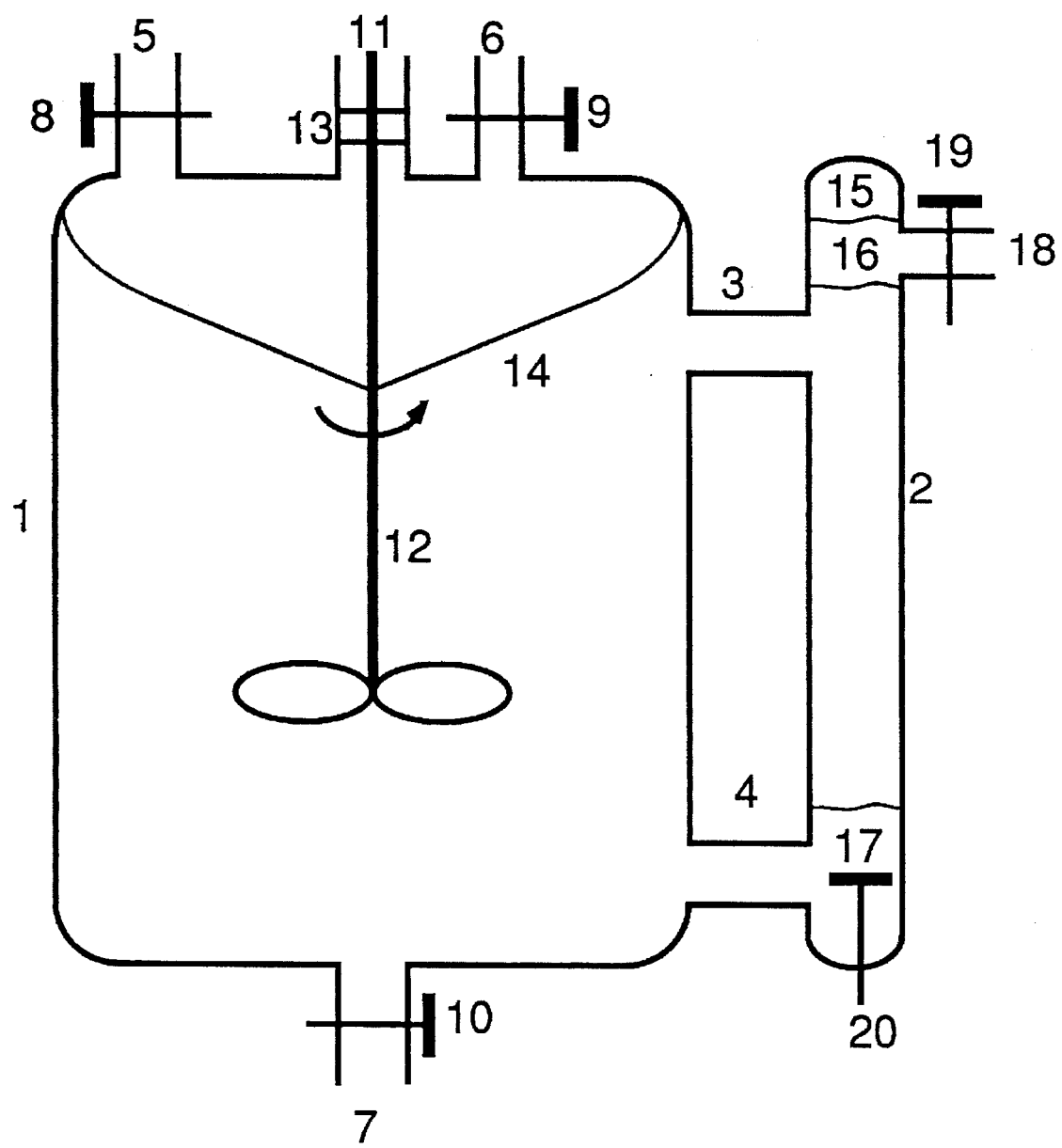

PREPARATION OF POLYOXYALKYLENE GLYCOL MONOESTERS OF MONOCARBOXYLIC ACIDS

This application is a continuation of application Ser. No. 07/843,809, filed Feb. 28, 1992, now abandoned.

The present invention relates to a process for the preparation of polyoxyalkylene glycol monoesters of monocarboxylic acids.

Polyoxyalkylene glycol monoesters of carboxylic acids based on tetrahydrofuran (THF), referred to below as poly-THF monoesters, are prepared according to EP-A 286 454 by polymerizing THF by Lewis or Brönsted acid-catalyzed polymerization with ring cleavage to give polyoxybutylene glycol, also referred to as polytetrahydrofuran (poly-THF), and terminating the polymerization by adding a carbonyl halide and then working up the reaction mixture by hydrolysis, or by adding a salt of a carboxylic acid, with formation of the poly-THF monoester. Since very strong and highly corrosive Lewis or Brönsted acid catalysts, such as antimony hexafluoride, silver antimony hexafluoride, silver tetrafluoborate or trifluoromethanesulfonic acid have to be used in this process, in turn requiring the use of particularly corrosion-resistant special materials, expensive apparatuses are required in this process. Apart from this, this method of preparation gives very polydisperse poly-THF monoesters, ie. the poly-THF monoesters thus obtained have a broad molecular weight distribution. As a rule, however, poly-THF monoesters having a very narrow molecular weight distribution are desired. Moreover, depending on their use, the usefulness of the resulting poly-THF monoesters is greatly restricted owing to their high color index.

JP-A 83 028/1983 describes the polymerization of THF in the presence of a carbonyl halide or carboxylic anhydride, a heteropolyacid being used as the catalyst under anhydrous conditions. However, this gives poly-THF diesters which cannot be converted selectively into the corresponding monoesters and are therefore completely hydrolyzed to poly-THF.

Thus, it has to date not been possible selectively and economically to prepare poly-THF monoesters having a narrow molecular weight distribution and a low color index by a direct route, ie. in one reaction stage, from the monomers.

It is an object of the present invention to solve this problem.

We have found that this object is achieved by a process for the preparation of polyoxyalkylene glycol monoesters of carboxylic acids, wherein tetrahydrofuran or a mixture of tetrahydrofuran with a total of not more than 95 mol %, based on the amount of THF used, of one or more comonomers from the group consisting of the cyclic ethers and acetals is polymerized in the absence of water and in the presence of a monocarboxylic acid and of an anhydrous heteropolyacid catalyst.

According to the invention, polyoxyalkylene glycol monoesters of carboxylic acids, based on polyoxybutylene glycol, are prepared by the present process, ie. the polyoxyalkylene glycol radical of the polyoxyalkylene glycol monoester may consist exclusively of poly-THF, but it may also be composed of comonomeric building blocks from the group consisting of the cyclic ethers and acetals.

3-, 4-, 5-, 6- and/or 7-membered cyclic ethers and/or acetals are advantageously used as comonomeric cyclic ethers and acetals in the novel polymerization process. However, higher cyclic ethers, such as bicyclic ethers, crown ethers, or oligomeric cyclic ethers of oxybutylene units, ie. cyclic oligomers of THF, can also be used.

Examples of such comonomeric ethers and acetals are the following compounds: ethylene oxide, propylene oxide, isobutylene oxide, epichlorohydrin, oxetane, 3,3-dimethyloxetane, 3,3-bis-chloromethyloxetane, methyltetrahydrofurans, 1,3-dioxolan, tetrahydropyran, dioxanes, trioxane and oxepan.

In general, the comonomers are used in total amounts of not more than 95, preferably from 0.1 to 70, in particular from 1 to 30, mol %, based on tetrahydrofuran used. Particularly preferably, poly-THF monoesters of carboxylic acids are prepared from the monomer THP alone by the novel process.

The novel polymerization is catalyzed by heteropolyacids.

For the purposes of the present invention, heteropolyacids are inorganic poly acids which have two or more different central atoms and are formed from weak, polybasic oxo acids of a metal, preferably from those of chromium, of molybdenum, of vanadium and of tungsten and/or the corresponding oxides of these metals ($CrO_3$, $MoO_3$, $V_2O_5$ or $WO_3$) and those of another metal or nonmetal, for example arsenic, boron, iodine, phosphorus, selenium, silicon, germanium or tellurium, as mixed, partial anhydrides. As a rule, the atomic ratio of the first-mentioned to the last-mentioned elements in these heteropolyacids is from 2.5 to 12, preferably 9 or 12.

Examples of heteropolyacids which can be used in the novel process are the following compounds: dodecamolybdatophosphoric acid ($H_3PMo_{12}O_{40} \cdot nH_2O$), dodecamolybdatosilicic acid ($H_4SiMo_{12}O_{40} \cdot nH_2O$), dodecamolybdatoceric (IV) acid ($H_8CeMo_{12}O_{42} \cdot nH_2O$), dodecamolybdatoarsenic (V) acid ($H_3AsMo_{12}O_{24O40} \cdot nH_2O$), hexamolybdatochromic (III) acid ($H_3CrMo_6O_{24}H_6 \cdot nH_2O$), hexamolybdatonickelic (II) acid ($H_4NiMo_6O_{24}H_6 \cdot 5H_2O$), hexamolybdatoiodic acid ($H_5IMo_6O_{24} \cdot nH_2O$), octadecamolybdatodiphosphoric acid ($H_6P_2Mo_{18}O_{62} \cdot 11H_2O$), octadecamolybdatodiarsenic (V) acid ($H_6As_2Mo_{18}O_{62} \cdot 25H_2O$), nonamolybdatomanganic (IV) acid ($H_6MnMo_9O_{32} \cdot nH_2O$), undecamolybdatovanadatophosphoric acid ($H_4PMo_{11}VO_{40} \cdot nH_2O$), decamolybdatodivanadatophosphoric acid ($H_5PMo_{10}V_2O_{40} \cdot nH_2O$), dodecavanadatophosphoric acid ($H_7PV_{12}O_{36} \cdot nH_2O$), dodecatungstatosilicic acid ($H_4SiW_{12}O_{40} \cdot 7H_2O$), dodecatungstatophosphoric acid ($H_3PW_{12}O_{40} \cdot nH_2O$), dodecatungstatoboric acid ($H_5BW_{12}O_{40} \cdot nH_2O$), octadecatungstatodiphosphoric acid ($H_6P_2W_{18}O_{62} \cdot 14H_2O$), octadecatungstatodiarsenic(V) acid ($H_6As_2W_{18}O_{62} \cdot 14H_2O$) and hexamolybdatohexatungstatophosphoric acid ($H_3PMo_6W_6O_{40} \cdot nH_2O$).

Of course, mixtures of heteropolyacids can also be used. Because they are readily available, dodecatungstatophosphoric acid, dodecatungstatosilicic acid, dodecamolybdatophosphoric acid, nonamolybdatophosphoric acid and dodecamolybdatosilicic acid are preferably used for the novel process.

The free heteropolyacids are preferably used according to the invention, but it is also possible to employ their salts, in particular their alkali metal and alkaline earth metal salts, as catalysts. The heteropolyacids and their salts are known compounds and can be prepared by known processes, for example by the methods of Brauer (editor): Handbuch der Präparativen Anorganischen Chemie, Volume III, pp. 1774–1798, Enke, Stuttgart, 1981, or by the methods of Top. Curr. Chem. 76 (1978), 1.

The heteropolyacids prepared in this manner are in hydrated form and, before being used in the novel process, are freed from water present therein and bonded by coordinate bonds. This dehydration can advantageously be carried out thermally, for example by the method described in Makromol. Chem. 190 (1989), 929. Depending on the heteropolyacid used, another possible method of dehydrating it is to dissolve it in an organic solvent, for example in a dialkyl ether or alcohol, displace the water with the organic solvent from its coordinate bond to the heteropolyacid and remove the water azeotropically with the solvent. Anhydrous heteropolyacids prepared by these methods can be introduced as a catalyst in the novel process.

The heteropolyacid catalysts can also be used as heterogeneous catalysts in the novel process. For this purpose, the heteropolyacid is advantageously applied to a carrier which is inert under the reaction conditions, such as active carbon, silica, titanium dioxide or zirconium dioxide, by a conventional method, for example by impregnating the relevant carrier with a solution of the heteropolyacid in a solvent, preferably an organic solvent, and then carrying out drying at from 100° to 300° C., preferably from 130° to 250° C., under reduced pressure.

The reaction mixture for the novel preparation of polyoxyalkylene glycol monoesters of carboxylic acids contains a monocarboxylic acid as further essential component.

In the novel process, all types of monocarboxylic acids can in principle be used, such as aliphatic, cycloaliphatic, aromatic and araliphatic carboxylic acids. These may furthermore carry substituents which are inert under the reaction conditions, such as alkyl groups, halogen atoms or ether groups. Unsaturated aliphatic or cycloaliphatic carboxylic acids may also advantageously be reacted However, aliphatic $C_1$–$C_{18}$-monocarboxylic acids and aromatic monocarboxylic acids, such as benzoic acid, are advantageously used in the novel process. Aliphatic $C_1$–$C_8$-monocarboxylic acids and benzoic acid are preferably used. The use of $C_1$–$C_4$-monocarboxylic acids, such as formic acid, acetic acid, propionic acid, butyric acid, pivalic acid, acrylic acid or methacrylic acid, is particularly preferred.

The carboxylic acid content of the reaction mixture influences the average molecular weight of the resulting polymer. As a rule, it is true that the higher the content of carboxylic acid in the reaction mixture the lower is the average molecular weight of the resulting polymer. Accordingly, the average molecular weight of the polymer produced increases with decreasing carboxylic acid content of the reaction mixture. At very low carboxylic-acid contents, a larger amount of cyclic oxyalkylene oligomers may form.

The term average molecular weight or average molecular mass is understood here and below as the number average molecular weight $M_n$ of the polymers present in the polymer mixture formed.

The carboxylic acid content of the reaction mixture also influences its phase behavior. At high carboxylic acid contents, the reaction mixture consists of a homogeneous phase making isolation of the catalyst more difficult subsequently during working up of the reaction mixture. At very low carboxylic acid contents, the heteropolyacid is not completely dissolved by the reaction mixture. In the novel process, the carboxylic acid contents of the reaction mixture are preferably such that two homogeneous, liquid phases form in the reaction mixture, the heavier, lower phase containing the major part of the heteropolyacid catalyst and the carboxylic acid, in addition to monomeric starting material and freshly formed polymer, and the lighter, upper phase essentially being composed of the monomeric starting material and polymer dissolved therein, in addition to residual amounts of carboxylic acid and catalyst.

Particularly in the batchwise embodiment, carboxylic acid contents of from 0.1 to 15, advantageously from 1 to 8, mol of carboxylic acid per mol of heteropolyacid are used in the novel process. Since in the continuous operation of the novel process some of the carboxylic acid dissolved in the upper, product-containing and monomer-containing phase is discharged continuously together with the product from the reactor, but the carboxylic acid present in the lower, catalyst-containing phase is consumed in the preparation of the polyoxyalkylene glycol monoester, it is advantageous to control the carboxylic acid feed to the reaction mixture, for replenishing the consumed and discharged carboxylic acid, in such a way that the abovementioned concentration ratios are established in the catalyst phase. Under these conditions, the reaction system described above and consisting of two homogeneous, liquid phases is formed, in which system polyoxyalkylene glycol monoesters having virtually any average molecular weights, in particular however polyoxyalkylene glycol monoesters having the economically particularly important average molecular weights of from 500 to 3,500, can be prepared in a controlled manner and with good selectivity.

We have found that, for the preparation of polyoxyalkylene glycol monoesters having certain average molecular weights and a narrow molecular weight distribution, it is advantageous, particularly in the continuous process, if the carboxylic acid concentration required for the preparation of such a polymer, in the catalyst phase, is as far as possible kept constant. In the continuous process, an advantageous procedure therefore comprises continuously replenishing the carboxylic acid in the reaction mixture by feeding in fresh or recycled carboxylic acid, according to the consumption during the reaction and taking into account the carboxylic acid discharged together with the product-containing upper phase and the distribution of the carboxylic acid between the catalyst phase and the upper phase, in such a way that the carboxylic acid concentration in the catalyst phase is kept substantially constant. In the batchwise embodiment of the novel process, the abovementioned factors do not of course as a rule have such a critical effect on the result of the process as in the continuous process.

However, there has to date been no reliable method by means of which it was possible to measure the carboxylic acid concentration in the concentrated, heteropolyacid-containing catalyst phase; in particular, there was no method of measurement by means of which the carboxylic acid concentration in this catalyst phase could be measured sufficiently rapidly and accurately in order to enable the feed of fresh carboxylic acid to be regulated according to the requirements of a continuous industrial process via an analog control coupled therewith.

We have found that the concentration of the carboxylic acid in the catalyst phase can advantgeously be determined by measuring the electrical conductivity of the liquid catalyst phase. The electrical conductivity can be measured in the novel process, for example, with the aid of the techniques, circuits and measuring arrangements as described by T. and L. Shedlovsky in A. Weissberger, B. W. Rossiter (Ed.) Techniques of Chemistry, Volume I, pages 163 to 204, Wiley-Interscience, New York, 1971. The concentration of the relevant carboxylic acid in the catalyst phase can be determined in a simple manner with the aid of the resulting conductivity measurement, on the basis of a previously prepared calibration curve. As a rule, it is advisable to prepare individual calibration curves for the different carboxylic acid/heteropolyacid systems used. Since the conductivity measurement is an electrical method of measurement, the measuring means can he very simply coupled to the carboxylic acid metering apparatus for the purpose of analog control of the carboxylic acid addition. This combined measuring and metering method has a very advantageous effect on the product quality, particularly in the continuous embodiment of the novel process.

The molecular weight of the polyoxyalkylene glycol monoester formed in the novel process is not dependent only on the amount of heteropolyacid catalyst added and of the carboxylic acid but is also influenced by the type of heteropolyacid used or of the carboxylic acid used.

For example, under otherwise identical conditions, a polymer having an average molecular weight of 1,500 is obtained in the reaction of THF and formic acid with anhydrous dodecatungstatophosphoric acid, whereas a polymer having an average molecular weight of 2,900 is formed when benzoic acid is used, and a poly-THF mono-acetate having an average molecular weight of 1,800 is obtained when acetic acid is used as the carboxylic acid, together with dodecamolybdatophosphoric acid, whereas a poly-THF monoacetate having an average molecular weight of 2,000 is formed using dodecatungstatosilicic acid.

By varying the reaction parameters: amount, type of heteropolyacid used and carboxylic acid, it is thus possible to prepare tailor-made polyoxyalkylene glycol monoesters having a certain average molecular weight and at the same time a relatively narrow molecular weight distribution. As a rule, these process parameters can be optimally adjusted by a few routine experiments.

The novel process can be carried out continuously or batchwise. For this purpose, the heteropolyacid is advantageously used in amounts of from 10 to 300, preferably from 50 to 150, parts by weight, based on 100 parts by weight of the monomer mixture used or 100 parts by weight of tetrahydrofuran. It is also possible to use larger amounts of the heteropolyacid catalyst.

The heteropolyacid can be added to the reaction in solid form, after which it is gradually solvated by being brought into contact with the further reactants, with formation of the liquid catalyst phase. It is also possible to adopt a procedure in which the solid heteropolyacid is made into a slurry with the carboxylic acid and/or monomer to be used and the resulting catalyst solution is passed into the reactor as a liquid catalyst phase. Both the catalyst phase and the monomeric starting material may be initially taken in the reactor. However, it is also possible for both components to be passed simultaneously into the reactor.

The polymerization is usually carried out at from 0° to 150° C., preferably from 30° to 80° C. Atmospheric pressure is preferably used but superatmospheric pressure, mainly the autogenous pressure of the reaction system, may also be convenient and advantageous. Since the polymerization is preferably carried out in a two-phase system, it is necessary to ensure thorough mixing of the two phases. For this purpose, the reactor must be equipped with efficient mixing means, for example stirrers, both in the batchwise procedure and in the continuous one. In the batchwise process, a stirred kettle is generally used for this purpose, the two liquid phases being separated from one another after the end of the reaction.

BRIEF DESCRIPTION OF THE DRAWINGS

However, the continuous procedure is preferably used. The reaction can be carried out in conventional reactors or reactor arrangements suitable for continuous processes, for example in tube reactors equipped with baffles which ensure thorough mixing of the two-phase system, or in stirred kettle cascades, the reaction being followed by continuous separation of the catalyst phase from the monomer-containing and product-containing upper phase. An apparatus as shown schematically in the FIGURE is advantageously used in the novel process.

DETAILED DESCRIPTION OF THE DRAWINGS

This apparatus is a stirred kettle 1 which is combined with a phase separator 2, is otherwise of conventional design and can be equipped with either external or internal heating and which is provided with inlet connections 5, which are generally separate, for feeding in the individual reactants and flushing with inert gas. In the FIGURE, for clarity the kettle heating is not shown and only one inlet connection 5, representative of all others, is drawn. Furthermore, an apparatus for pressure equilibration 6 and an outlet connection 7 are mounted on the reactor. All these apparatuses are provided with separate control apparatuses 8, 9 and 10, for example gate valves or valves, which permit opening and closing of these connections and regulation of the feed. The reactor is provided with a stirrer 12 which is connected to the outside by the guide 11 sealed by means of the bush 13. The stirred kettle 1 is connected to the phase separator 2 via the feeds 3 and 4 roughly at the height of the upper and lower third, respectively. The product solution obtained in the reaction is removed from the apparatus via the outlet connection 18 which is advantageously mounted above the feed 3. The outflow of the product solution is regulated by means of the control apparatus 19, which may be, for example, a gate valve or a valve.

To operate this continuous apparatus, the reactants are initially taken in the reactor and are thoroughly mixed at the desired reaction temperature by means of the stirrer 12, an emulsion-like mixture of the catalyst phase and the upper phase being formed. The flow produced in the reaction mixture by the stirrer causes the emulsion-like mixture to pass via the feed 3 into the phase separator 2, in which the catalyst phase and the monomer-containing and product-containing upper phase separate owing to their different densities. The colorless, product-containing upper phase and the clear catalyst phase, which may differ in color depending on the heteropolyacid used, separate out from the cloudy, emulsion-like reaction mixture roughly above the dashed line 16 and below the dashed line 17, respectively. The product phase is removed via the outlet 18 while the catalyst phase flows back into the stirred kettle via the feed 4, owing to the suction generated by the stirrer 12, and is again fluidized there with the monomer-containing and product-containing upper phase. The lines 14 and 15 denote the approximate liquid miniscus and liquid level in the stirred kettle and phase separator, respectively, during operation. Fresh monomer and fresh carboxylic acid are introduced into the stirred kettle via the feed connections 5. The carboxylic acid feed is controlled with the aid of the conductivity measuring cell 20 immersed in the liquid catalyst phase, in such a way that the desired carboxylic acid content in the catalyst phase remains constant within the accuracy of regulation.

Fresh monomer is usually metered into the reactor in a controlled manner via level regulation. Advantageously, fresh monomer is fed in at the rate at which the product and unconverted monomer are discharged from the reaction apparatus. In this way, it is also possible to control the reaction time and hence the polymerization time, providing a further means for influencing and adjusting the average molecular weight of the resulting polymer. In general, the polymerization is carried out for from 0.5 to 50, preferably from 1 to 10, particularly preferably from 1 to 8, hours in the batchwise process, depending on the amount of catalyst and the reaction mixture. In the continuous process, residence times of from 1 to 8, preferably from 2 to 5, hours are usually established. At the beginning of the continuous reaction, the reaction system described requires a certain time before a steady-state equilibrium has been established and during which it may be advantageous to keep the outlet 18 closed with the aid of the control apparatus 19, ie. not to discharge any product solution from the reaction apparatus.

The catalyst phase remains in the reaction apparatus and is continuously replenished by feeding in fresh catalyst and/or, if necessary, by recycling the discharged catalyst, according to the catalyst losses arising as a result of discharge of small amounts of catalyst with the product-containing upper phase.

If a heterogeneous heteropolyacid catalyst is used for the preparation of the poly-THF monoesters, it may be employed as a suspended catalyst, but preferably as a fixed bed catalyst. When a fixed bed catalyst is used, the reaction mixture can be passed over the heterogeneous heteropolyacid catalyst by the liquid phase or trickle bed procedure.

The novel process is advantageously carried out under an inert gas atmosphere, and any inert gases, such as nitrogen or argon, may be used. Before being used, the reactants are freed from any water and peroxides present therein.

The addition of organic solvents which are inert under the reaction conditions, for example aliphatic and aromatic hydrocarbons and halohydrocarbons, is possible and may be advantageous in that separation of the catalyst phase and upper phase is facilitated. As a rule, the monomer serves both as a reactant and as a solvent in the novel process.

The polymer-containing upper phase can be worked up, for example, by a method in which traces of heteropolyacid present therein are neutralized by adding a base, such as a dilute alkali metal or alkaline earth metal hydroxide, ammonia solution or an alkali metal or alkaline earth metal carbonate solution or bicarbonate solution, monomers present therein are distilled off and the polyoxyalkylene glycol monoester remaining in the distillation residue is filtered to separate off precipitated salts. The monomer recovered in the distillation can of course be recycled to the reaction.

In the novel process, polyoxyalkylene glycol monoesters of monocarboxylic acids and in particular poly-THF monoesters of monocarboxylic acids can be obtained economically, in good yield, selectively and with a narrow molecular weight distribution in very pure form. The monoesters which can be prepared according to the invention are used, for example, as plasticizers (U.S. Pat. No. 4,482,411), impregnating agents (DE-A 29 32 216), monomers (EP-A 286 454), emulsifiers and dispersants (JP-A 138 452/1987) and are also employed for deinking in the recycling of waste paper (JP-A 303 190/1988).

EXAMPLES

The average molecular weights ($M_n$) of the polymers prepared according to the Examples were determined by gel permeation chromatography, a standardized polystyrene being used for calibration. A number average molecular weight $M_n$ was calculated from the chromatograms using the equation $M_n = \Sigma c_i / \Sigma c_i / M_i$, where $c_i$ is the concentration of the individual polymer species i in the resulting polymer mixture and $M_i$ is the molecular weight of the individual polymer species i. The molecular weight distribution, referred to below as the dispersity D, was calculated from the ratio of the weight average molecular weight ($M_w$) and the number average molecular weight ($M_n$) using the equation $M_w/M_n = D$. The weight average molecular weight $M_w$ was determined from the chromatograms obtained, with the aid of the formula $M_w = \Sigma c_i \cdot M_i / \Sigma c_i$, where $c_i$ and $M_i$ have the stated meanings.

The samples used for determining the dispersity were not subjected to a prior molecular distillation to remove volatile, short-chain polymers, as is generally the case, and the value determined for D was therefore higher than was to be expected after a molecular distillation.

All reactants used were anhydrous and peroxide-free.

Example 1

50 g of anhydrous dodecatungstatophosphoric acid were dissolved in 100 g of THF which contained 1% by weight of formic acid, and the solution was stirred for 4 hours at 60° C. under a nitrogen atmosphere. After cooling to room temperature, the two liquid phases were separated. 12 g of a clear, colorless, viscous polymer were obtained from the upper phase after the unconverted THF had been distilled off. The resulting poly-THF monoformate had an average molecular weight ($M_n$) of 1,500.

Example 2

50 g of anhydrous dodecamolybdatophosphoric acid were dissolved in 100 g of dry tetrahydrofuran which contained 1.3% by weight of acetic acid, and the solution was stirred for 4 hours at 60° C. under a nitrogen atmosphere. After the reaction mixture had been cooled to room temperature, the two liquid phases were separated. 12 g of a clear, colorless, viscous polymer having an average molecular weight ($M_n$) of 1,800 were obtained from the upper phase after the unconverted THF had been distilled off.

Example 3

50 g of anhydrous dodecatungstatophosphoric acid were dissolved in 100 g of dry THF which contained 2.7% by weight of benzoic acid, and the solution was stirred for 4 hours at 60° C. under a nitrogen atmosphere. After cooling to room temperature, the two liquid phases were separated. 20 g of a clear, colorless, viscous polymer having an average molecular weight of 2,900 were obtained from the upper phase after the unconverted THF had been distilled off. The dispersity was 2.0.

Example 4

500 g of anhydrous dodecatungstatophosphoric acid were dissolved in 1000 g of dry THF which contained 3.5% by weight of acetic acid, and the solution was stirred for 4 hours at 60° C. under a nitrogen atmosphere. Thereafter, 250 g/hour of THF, containing 3.5% by weight of acetic acid, were added in the course of 100 hours, and the same amount of upper phase was removed from the reactor. The product-containing upper phase discharged from the reactor was mixed with the same volume of n-heptane, liquid heteropolyacid separating out. After the two phases had separated, the organic phase was passed over active carbon, and the readily volatile constituents, such as THF, acetic acid and heptane, were removed under reduced pressure. The average THF conversion was 224. The resulting poly-THF monoacetate had an average molecular weight ($M_n$) of 1,800, a dispersity of 1.7 and a color index (APHA) of less than 10.

Example 5

50 g of anhydrous dodecatungstatophosphoric acid were dissolved in a mixture of 80 g of THF and 20 g of 1,4-dioxane, which mixture contained 3.6% by weight of acetic acid, and the solution was stirred for 4 hours at 60° C. under a nitrogen atmosphere. After cooling to room temperature, the two liquid phases were separated. 24 g of a clear, viscous polymer were obtained from the upper phase after the unconverted THF, 1,4-dioxane and acetic acid had been distilled off. The resulting copolymeric polyoxyalkylene glycol monoacetate had an average molecular weight ($M_n$) of 1,400.

Example 6

A supported catalyst which contained dodecatungstatophosphoric acid on active carbon was used for the polymerization. The catalyst was prepared as follows: 150 g of undried dodecatungstatophosphoric acid were dissolved in 1,500 g of dry THF, 750 g of active carbon (Merck, particle size from 0.5 to 0.85 mm) were added and stirring was carried out for two hours at room temperature. Thereafter, the supported catalyst was filtered off and, before being used, was dried at 150° C. under reduced pressure until water was no longer detectable in the catalyst. The supported catalyst contained 10% by weight of $H_3PW_{12}O_{40}$.

150 g of the catalyst prepared in this manner were arranged as a fixed bed in an oil-heated double-jacketed tube. A mixture of 330 g of THF and 6 g of acetic acid was circulated over this catalyst at 60° C. for eight hours. The liquid phase was then evaporated down under reduced pressure. A clear, viscous residue of 8.2 g of poly-THF monoacetate remained.

Example 7

50 g of anhydrous dodecatungstatosilicic acid were dissolved in 100 g of dry THF which contained 1.3% by weight of acetic acid, and the solution was stirred for 4 hours at 60° C. in a nitrogen atmosphere. After the reaction mixture had been cooled to room temperature, the two liquid phases were separated. 18 g of a clear, colorless, viscous polymer having an average molecular weight ($M_n$) of 2,000 were obtained from the upper phase after the unconverted THF had been distilled off.

We claim:

1. A process for the preparation of a polyoxyalkylene glycol monoester of a monocarboxylic acid, which comprises:

polymerizing tetrahydrofuran or a mixture consisting of tetrahydrofuran with a total of not more than 95 mol %, based on the tetrahydrofuran used, of one or more comonomers selected from the group consisting of cyclic ethers and acetals, in the absence of water and in the presence of a monocarboxylic acid and also in the presence of 10 to 300 parts by weight, per 100 parts by weight of the monomers used, of an acid catalyst consisting essentially of a solvated, anhydrous heteropolyacid, the content of the monocarboxylic acid being chosen to form the reaction mixture into two homogeneous, liquid phases, wherein the heavier phase contains the major part of the heteropolyacid catalyst and of the carboxylic acid in addition to monomeric starting material and freshly formed polymer and wherein the lighter phase is composed essentially of the monomeric starting material and polymer dissolved therein in addition to residual amounts of carboxylic acid and catalyst.

2. A process as claimed in claim 1, wherein tetrahydrofuran is polymerized to obtain the polyoxybutylene glycol monoester of a monocarboxylic acid.

3. A process as claimed in claim 1, wherein the polymerization is carried out batchwise in the presence of from 0.1 to 15 mol of carboxylic acid per mol of the heteropolyacid.

4. A process as claimed in claim 1, wherein the polymerization is carried out at from 0° to 150° C.

5. A process as claimed in claim 1, wherein the reaction is carried out continuously in said two-phase system and a carboxylic acid concentration of from 0.1 to 15 mol of carboxylic acid per mol of heteropolyacid is established in the catalyst phase.

6. A process as claimed in claim 5, wherein the content of monocarboxylic acid in the reaction is controlled to produce a polyoxyalkylene glycol monoester having an average molecular weight of from 500 to 3,500.

7. The product obtained by the process of claim 6.

8. A process as claimed in claim 5, wherein the process is carried out continuously in said two-phase system and the carboxylic acid concentration is maintained at a substantially constant value between about 0.1 and 15 mol of carboxylic acid per mol of heteropolyacid in the catalyst phase.

9. A process as claimed in claim 8, wherein said carboxylic acid concentration is maintained at a substantially constant value between about 1 an 8 mol of carboxylic acid per mol of heteropolyacid in the catalyst phase.

10. The polyoxyalkylene glycol monoester product obtained by the process of claim 9 and having an average molecular weight of from 500 to 3,500.

11. A process as claimed in claim 1, wherein the anhydrous heteropoyacid catalyst is a polybasic oxo acid of (a) at least one metal selected from the group consisting of chromium, molybdenum, vanadium and tungsten and/or their corresponding oxides, and (b) at least one element selected from the group consisting of arsenic, boron, iodine, phosphorus, selenium, silicon, germanium and tellurium, the atomic ratio of the metal (a) to the element (b) being from about 2.5 to 12.

12. A process as claimed in claim 1, wherein the anhydrous heteropolyacid is selected from the group consisting of dodecatungstatophosphoric acid, dodecatungstatosilicic acid, dodecamolybdatophosphoric acid, nonamolybdatophosphoric acid and dodecamolybdatosilicic acid.

13. A process as claimed in claim 1, wherein the monocarboxylic acid is selected from the group consisting of aliphatic $C_1$–$C_{18}$-monocarboxylic acids and aromatic monocarboxylic acids.

14. A process as claimed in claim 1, wherein the monocarboxylic acid is selected from the group consisting of aliphatic $C_1$–$C_8$-monocarboxylic acids and benzoic acid.

15. A process as claimed in claim 1, wherein the monocarboxylic acid is selected from the group consisting of formic acid, acetic acid, propionic acid, butyric acid, pivalic acid, acrylic acid and methacrylic acid.

16. A process as claimed in claim 1, wherein the anhydrous catalyst is the free heteropolyacid or its alkali metal or alkaline earth metal salt.

17. A process as claimed in claim 1 wherein the monocarboxylic acid is formic acid.

18. A process for the preparation of a polyoxyalkylene glycol monoester of a monocarboxylic acid, which comprises:

polymerizing tetrahydrofuran or a mixture of tetrahydrofuran with a total of not more than 95 mol %, based on the amount of tetrahydrofuran used, of one or more comonomers selected from the group consisting of cyclic ethers and acetals as the monomeric reactant, said polymerization being carried out by contacting (A) a liquid reaction mixture which is free of water and peroxides and consists of said monomeric reactant and a monocarboxylic acid with (B) a heterogeneous heteropolyacid catalyst in solid form consisting of an anhydrous heteropolyacid supported on an inert carrier, and separating the liquid monoester product from the solid catalyst.

19. A process as claimed in claim 18, wherein the amount of the monocarboxylic acid used is adjusted to obtain the polyoxylalkylene glycol monoester product within a molecular weight range of from 500 to 3,500.

20. A process as claimed in claim 18, wherein said inert carrier is selected from the group consisting of active carbon, silica, titanium dioxide and zirconium dioxide.

21. A process as claimed in claim 18, wherein said inert carrier is active carbon.

22. A process as claimed in claim 18, wherein the monocarboxylic acid is a member selected from the group consisting of aliphatic $C_1$–$C_4$-monocarboxylic acids and benzoic acid.

23. A process as claimed in claim 18, wherein the monocarboxylic acid is formic acid.

* * * * *